Figure 1:
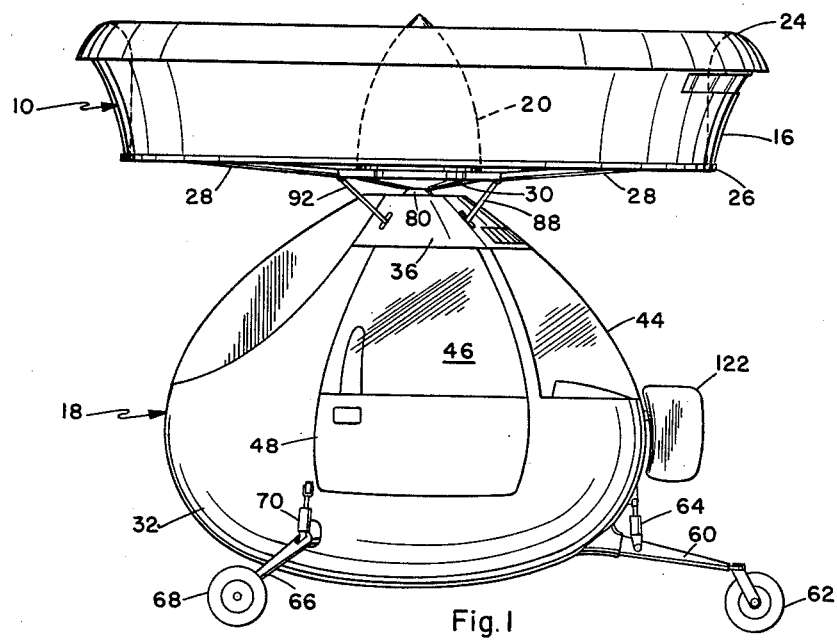

June 2, 1964 L. K. V. SUDROW 3,135,481
DUCTED ROTOR AIRCRAFT
Filed July 17, 1961 3 Sheets-Sheet 1

INVENTOR.
LYLE K. V. SUDROW
BY Knox & Knox

June 2, 1964  L. K. V. SUDROW  3,135,481
DUCTED ROTOR AIRCRAFT

Filed July 17, 1961  3 Sheets-Sheet 2

INVENTOR.
LYLE K. V. SUDROW
BY *Knox & Knox*

June 2, 1964 L. K. V. SUDROW 3,135,481
DUCTED ROTOR AIRCRAFT
Filed July 17, 1961 3 Sheets-Sheet 3
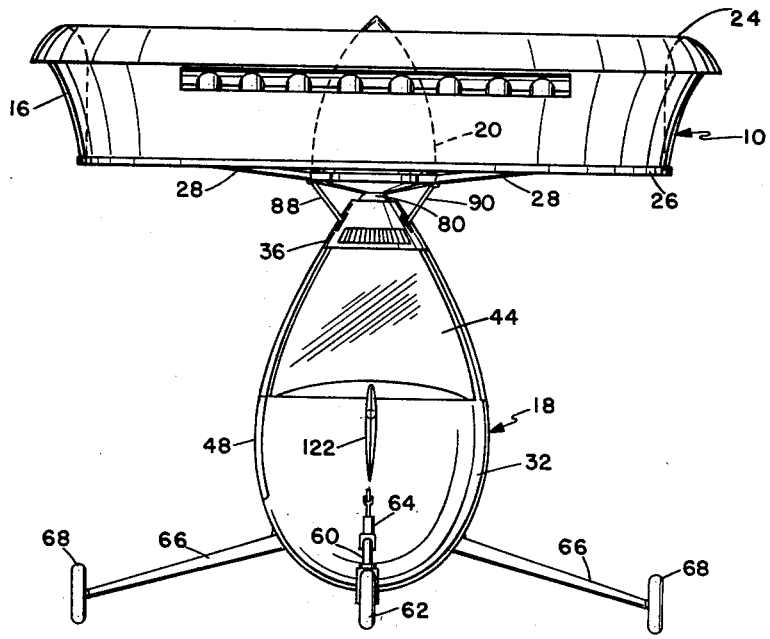
Fig. 5
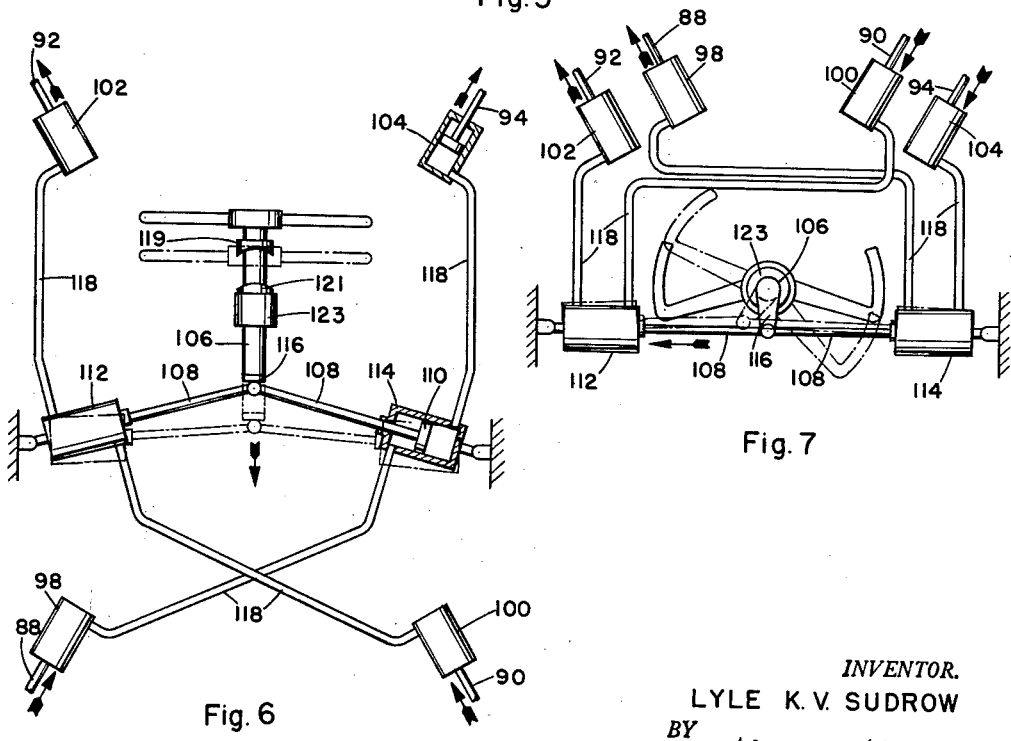
Fig. 6
Fig. 7
INVENTOR.
LYLE K. V. SUDROW
BY Knox & Knox

United States Patent Office 3,135,481
Patented June 2, 1964

3,135,481
DUCTED ROTOR AIRCRAFT
Lyle K. V. Sudrow, Los Angeles, Calif., assignor to Helipod, Inc., Oceanside, Calif., a corporation of California
Filed July 17, 1961, Ser. No. 124,566
2 Claims. (Cl. 244—23)

The present invention relates to an aircraft, more specifically a rotor sustained aircraft of compact and simple design.

Conventional aircraft require considerable space for their operation, particularly in take-off and landing, and do not provide complete transportation from point to point, since airports of suitable size are usually quite some distance from residential or business districts. Specialized aircraft capable of operating from very small spaces include helicopters, which are complex, expensive and require considerable skill to operate safely. Other vertical take-off and landing aircraft utilize deflected thrust, auxiliary lifting means, or similar devices and are also complex and expensive. The ideal aircraft for personal transportation to any location must be capable of taking off and landing in a minimum area, such as a driveway, parking lot, roof top, or the like, be very simple to operate, have considerable inherent stability and be fail safe in case of engine failure, in addition to being economical to manufacture and operate.

The primary object of this invention is to provide such an aircraft, using a ducted rotor unit as the sole means of lift and propulsion and having a compact passenger compartment suspended from the center of the rotor in an overall balanced configuration.

Another object of this invention is to provide an aircraft in which the direction of flight is controlled by tilting the entire rotor unit.

Another object of this invention is to provide an aircraft having a very simple control system which is instinctive in operation, the aircraft moving in the direction in which the controls are deflected.

A further object of this invention is to provide an aircraft which is inherently stable and will remain steady when the controls are released, thus being especially safe to fly.

Another object of this invention is to provide an aircraft which is small in relation to its payload capacity, the structure being light in weight and adaptable to construction from reinforced plastic materials to a great extent.

Finally, it is an object to provide an aircraft of the aforementioned character which is simple and convenient to operate and maintain and which will give generally efficient and durable service.

Figure 2:
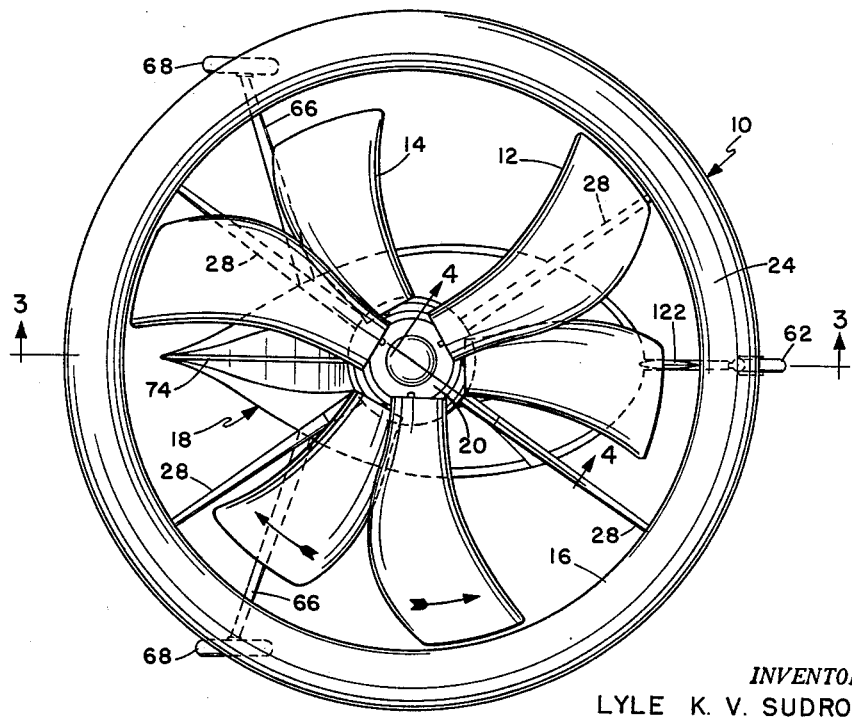
Figure 3:
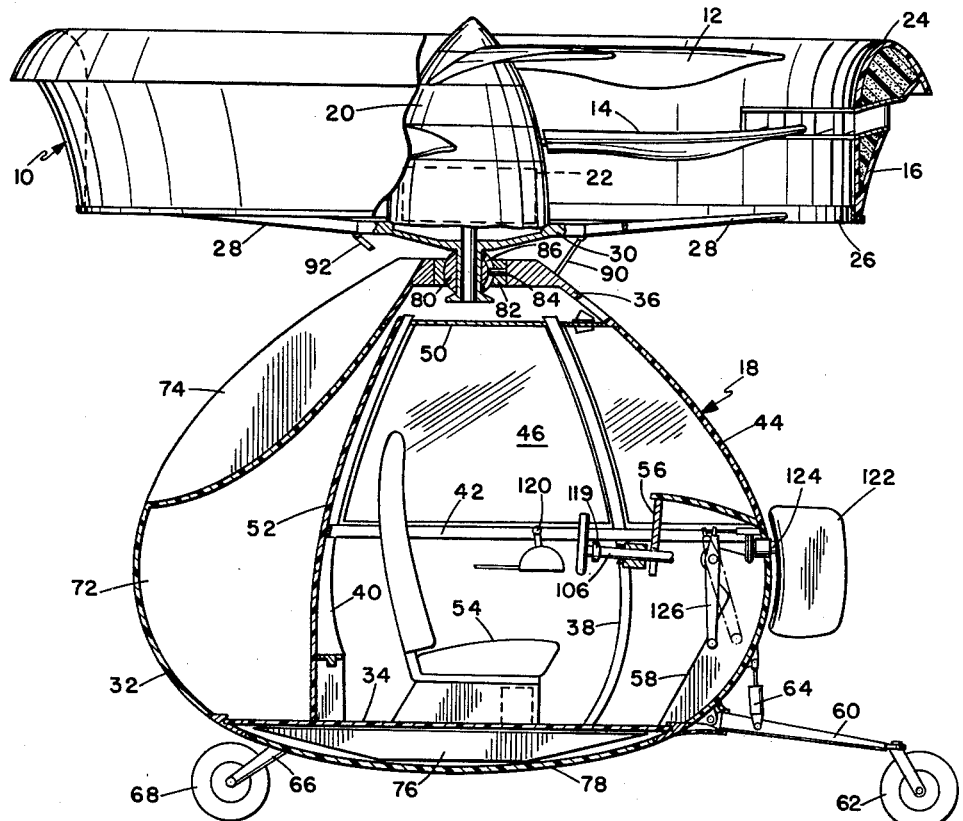
Figure 4:
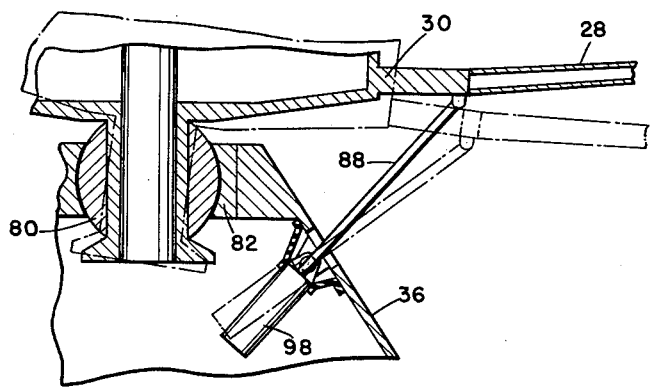

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a side elevation view of the aircraft;
FIGURE 2 is a top plan view thereof;
FIGURE 3 is an enlarged sectional view taken on the line 3—3 of FIGURE 2 with portions omitted for clarity;
FIGURE 4 is an enlarged fragmentary sectional view taken on the line 4—4 of FIGURE 2;
FIGURE 5 is a front elevation view of the aircraft;
FIGURE 6 is a diagrammatic view of the primary control system as seen from above; and
FIGURE 7 is a diagrammatic view of the control system as seen from the front, with the jacks offset for clarity.

Similar characters of reference indicate similar or identical elements and portions throughout the specification and throughout the views of the drawing.

General Structure

The aircraft comprises basically a rotor unit 10 containing a pair of counter-rotating rotors 12 and 14 in a circular duct 16, and a passenger cabin 18 suspended from the rotor unit. The term cabin is intended to describe the complete fuselage-like structure which contains the passenger compartment, controls and other equipment.

The rotor unit 10 has a central drive assembly 20 in the form of a large spinner structure streamlined in the direction of vertical airflow, the upper rotor 12 and lower rotor 14 rotating in opposite directions about the vertical axis of said drive assembly. Conventional counter-rotating drive means, not shown, may be used to couple the rotors, power being provided by an engine 22 in the lower portion of the drive assembly 20, as indicated in FIGURE 3. Various types of lightweight, compact engines are available, both reciprocating and turbine types being suitable. The duct 16 is of aerodynamic form having a curved upper inlet lip 24 and is held on an annular lower ring 26 which is supported by spider arms 28 extending radially from a base frame 30 at the lower end of drive assembly 20. Various types of rotor blades and arrangements may be used, the configuration illustrated having particular advantages and being fully described in my co-pending application of susbtantially even date herewith, entitled Ducted Sustaining Rotor for Aircraft.

The cabin 18, as illustrated, particularly in FIGURE 3, comprises a lightweight shell 32 of compound curvature, having a floor 34 at the lower end thereof and a rigid upper head member 36. The structure is braced by side frames 38 and 40 between the floor 34 and head member 36 and an interconnecting belt frame 42. A front windshield 44 and large windows 46 are provided, one side having a door 48. The passenger compartment is preferably enclosed by a roof panel 50 and a back panel 52 which extends between the rear side frames 40, and is provided with a suitable seat 54 and an instrument panel 56. At the forward end is a rigid nose frame 58 which carries a forwardly extending leg 60 on which is a castering nose wheel 62, the leg having a suitable shock absorber 64. At the rear of cabin 18 are a pair of outwardly extending main legs 66 carrying wheels 68 and supported by shock absorbers 70. Instrumentation can vary considerably according to requirements. The rear portion of cabin 18 forms a rear compartment 72 which can be used for luggage, accessory equipment, or even as an alternative compartment for the engine 22, with suitable driving connection to the rotor unit. The upper rear portion of the cabin is inset and fitted with a flat vertical fin 74. Below the floor 34 is a fuel tank 76 enclosed by a bottom cover 78.

The cabin 18 is aerodynamically streamlined from front to rear and is also smoothly streamlined vertically in the direction of rotor air flow, as in FIGURE 5. The shell construction is readily adaptable to the use of plastics, particularly fiber reinforced plastic materials, either laminated or hollow core. The compound curvature adds to the strength and makes it possible to use a minimum of supporting structure, with resultant increase in useful payload. It should be understood, however, that other construction methods may be used according to conventional aircraft practice.

Control System

The rotor unit 10 is universally connected to the cabin 18 by a ball element 80 integral with the base of drive assembly 20, said ball element being held in a correspondingly shaped seat 82 fixed in the head member 36, as in FIGURE 3. The rotor unit is prevented from rotating by a pin 84 in the seat 82, the pin 84 being slidable in a slot 86 cut in the ball element 80, said pin being radial to the ball center so that free universal motion is possible. Control of the rotor unit 10 is accomplished by four actuating rods 88, 90, 92, and 94, the upper ends of the rods being universally connected to the spider arms 28. The actuating rods extend into the head member 36 and are operated by four individual jacks 98, 100, 102 and 104, each jack being pivotally mounted, as illustrated in FIGURE 4, to allow for the tilting motions. Thus by selective operation of the jacks, the rotor unit 10 can be tilted in any direction, the resultant offset thrust providing directional control of the aircraft.

The jacks 88–94 may be of fluid or electrically operated type, a fluid system being illustrated in FIGURES 6 and 7 by way of an example. The system is operated by a substantially conventional control column 106 having fore and aft motion and side-to-side turning. The forward end of control column 106 is coupled by rods 108 to pistons 110 in a pair of double acting cylinders 112 and 114, the rods being pivotally attached to a radial arm 116 on said control column. Jacks 98 and 102 are connected to opposite ends of cylinder 112 by fluid conducting pipes 118, while jacks 100 and 104 are similarly coupled to opposite ends of cylinder 114.

*Control Operation*

From FIGURE 6 it will be seen that when the control column is pushed forwardly as indicated in broken line, both rods 108 thrust outwardly and the cylinders 112 and 114 apply pressure to jacks 102 and 104, while simultaneously reducing pressure on jacks 98 and 100. The various actions are indicated by directional arrows. Thus the actuating rods 92 and 94 are caused to lift the rear of the rotor unit 10, the retraction of actuating rods 88 and 90 allowing the front of the rotor unit to drop. With the rotor unit thus tilted, thrust is directed to the rear and the aircraft is driven forwardly. A rearward motion of the control column produces the opposite action to drive the aircraft rearwardly.

Lateral control is illustrated in FIGURE 7, the rotated position of the control column indicated in broken line causing the cylinders 112 and 114 to operate in opposite directions and pull one side of the rotor unit down. Combinations of fore and aft and turning motions will produce compound motions of the rotor unit, resulting in full direction thrust control. In full forward position, it will be evident that both rods 108 would be pushed outwardly their limit, which would prevent any rotation of the control column. Thus to obtain lateral control at full forward speed, a cam 119 is fixed to the control column 106 and, in the forward position, engages a matching cam 121 on the control column support 123. When the control column is turned, the cam action moves the control column slightly to the rear, relaxing the rods 108 and allowing the turning action. The closed fluid system illustrated is direct acting and extremely simple, but more complex systems involving valve and servo devices could be used in larger aircraft. Alternatively a simple mechanical system of cables and linkages could be used, the arrangement described being merely to illustrate the instinctive control actions, the direction of motion of the aircraft in each case being the same as the direction of motion of the control column.

Ascent and descent is controlled by engine speed, through a conventional throttle lever 120 conveniently located in the cabin. Pitch control of the rotors can also be used but the complex mechanism necessary adds to the weight and cost.

Steering or rotation of the aircraft is best accomplished by deflection of the rotor air flow, which is effective at all flight speeds and in hovering or vertical flight. One suitable means is the rudder 122 pivotally mounted on the nose of the cabin 18 on a horizontal, longitudinally extending shaft 124. Operation can be by conventional type rudder pedals 126, the deflection of the rudder causing a torque reaction to turn the aircraft.

*Advantages*

The aircraft has the vertical flight characteristics of a helicopter, combined with a high forward speed for the power used due to the clean design made possible by the overall simplicity. The ducted rotor is more efficient than a comparable open rotor and enables a smaller diameter rotor to lift a given load, the small size greatly facilitating landing in restricted spaces, as opposed to helicopters which require considerable rotor clearance. The rotor itself is inherently stable and the cabin is suspended from the rotor substantially in the manner of a pendulum, resulting in an extremely stable aircraft.

A minimum of structure is required and complete passenger, luggage and fuel facilities are contained in a compact, streamlined cabin assembly. While a single seat configuration is illustrated, it will be obvious that the aircraft is adaptable to a wide range of sizes.

The control system is simple and instinctive in operation, to make the aircraft suitable for flying with a minimum of instruction. All components are easily accessible for servicing, the aircraft being economical for maintenance and in operation.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:
1. An aircraft, comprising:
a rotor unit having a circular duct;
a driven sustaining rotor axially rotatably mounted in said duct;
a passenger containing cabin having a rigid upper head member;
said rotor unit being universally pivotally attached to said head member;
actuating means mounted in said head member and being connected to circumferentially spaced portions of said rotor unit;
and control means in said cabin operatively connected to said actuating means to operate the same selectively and tilt said rotor unit relative to the cabin.
2. An aircraft, comprising:
a rotor unit having a circular duct;
a drive unit axially mounted in said duct;
sustaining rotor means axially rotatably mounted on said drive unit and contained within said duct;
an engine contained in said drive unit and being operatively connected to drive said rotor means;
a passenger containing cabin universally pivotally suspended from said rotor unit;
actuating means mounted in said cabin and being connected to circumferentially spaced portions of said rotor unit to tilt the rotor unit relative to the cabin;
and control means in said cabin operatively connected to operate said actuating means selectively.

References Cited in the file of this patent

UNITED STATES PATENTS

| | | |
|---|---|---|
| 2,605,608 | Barclay | Aug. 5, 1952 |
| 2,806,662 | Yonkers | Sept. 17, 1957 |
| 2,829,846 | Keiper | Apr. 8, 1958 |
| 2,966,318 | Chodan | Dec. 27, 1960 |
| 3,055,613 | Taylor | Sept. 25, 1962 |

FOREIGN PATENTS

| | | |
|---|---|---|
| 1,186,372 | France | Feb. 23, 1959 |